(12) United States Patent
Hong et al.

(10) Patent No.: US 11,434,309 B2
(45) Date of Patent: Sep. 6, 2022

(54) CONTROLLING MOLECULAR WEIGHT DISTRIBUTION AND CHEMICAL COMPOSITION DISTRIBUTION OF A POLYOLEFIN PRODUCT

(71) Applicant: ExxonMobil Chemical Patents Inc., Baytown, TX (US)

(72) Inventors: Yifeng Hong, Houston, TX (US); Jay L. Reimers, Houston, TX (US); Jun Shi, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 121 days.

(21) Appl. No.: 16/828,258

(22) Filed: Mar. 24, 2020

(65) Prior Publication Data

US 2020/0317825 A1    Oct. 8, 2020

Related U.S. Application Data

(60) Provisional application No. 62/829,871, filed on Apr. 5, 2019.

(51) Int. Cl.
| | |
|---|---|
| *C08F 2/04* | (2006.01) |
| *C08F 2/12* | (2006.01) |
| *C08F 210/08* | (2006.01) |
| *C08F 210/14* | (2006.01) |
| *C08F 2/01* | (2006.01) |
| *C08F 210/02* | (2006.01) |
| *C08F 4/42* | (2006.01) |
| *C08F 210/06* | (2006.01) |

(52) U.S. Cl.
CPC .............. *C08F 2/04* (2013.01); *C08F 2/01* (2013.01); *C08F 4/42* (2013.01); *C08F 210/02* (2013.01); *C08F 210/06* (2013.01); *C08F 210/08* (2013.01); *C08F 210/14* (2013.01)

(58) Field of Classification Search
USPC ......................................................... 526/64
See application file for complete search history.

(56) References Cited

U.S. PATENT DOCUMENTS

| | | |
|---|---|---|
| 9,493,589 B1 | 11/2016 | Greco et al. |
| 2010/0160579 A1 | 6/2010 | Yang et al. |

FOREIGN PATENT DOCUMENTS

WO          97/36942 A    10/1997

OTHER PUBLICATIONS

Luo et al.,"Mathematical modeling of the molecular weight distribution of polypropylene produced in loop reactor", Polymer Engineering and Science, vol. 47, No. 10, Sep. 12, 2007, pp. 1643-1649.

*Primary Examiner* — Fred M Teskin

(57) ABSTRACT

A method broadening a molecular weight distribution and/or broadening a chemical composition distribution of the polyolefin product can include: polymerizing a feedstock in the presence of a metallocene catalyst in a loop reactor to produce a polyolefin product, the feedstock comprising two or more monomers; and adjusting a polymerization parameter selected from the group consisting of decreasing a recycle ratio, increasing a polymer concentration, increasing a LRSU number, and any combination thereof.

20 Claims, 3 Drawing Sheets

CONTROLLING MOLECULAR WEIGHT DISTRIBUTION AND CHEMICAL COMPOSITION DISTRIBUTION OF A POLYOLEFIN PRODUCT

CROSS-REFERENCE TO RELATED APPLICATIONS

This application claims priority to U.S. Ser. No. 62/829,871, filed Apr. 5, 2019, herein incorporated by reference.

BACKGROUND

The present invention relates to controlling the molecular weight distribution and chemical composition of a polyolefin product from a polymerization reaction.

In the industrial-scale polymerization reactions, solution polymerization and slurry polymerization are two major processes that involve dissolution or suspension of polymers in solvent. In the solution polymerization process, the monomer, catalyst/activator, and polymer are dissolved into the solvent, typically a nonreactive solvent. Heat released by the reaction is absorbed by the solvent and removed by various methods including, but not limited to, chilling the feed solvent, reflux cooling, jacketed cooling, and external heat exchangers. The solvent and unreacted monomers are flashed off from the polymers in the concentration and devolatilization stages after the reaction. The resulting molten polymers are then extruded and pelletized in water to form small pellets, which are dried and bagged sequentially. Slurry polymerization has similar steps with the major differences being that the polymers are suspended in the solvent and the solvent can be reactive.

Continuous stirred-tank reactor (CSTR) and loop reactors are used in both solution and slurry polymerization processes. While CSTR solution or slurry polymerization processes beneficially mix the reactants and catalyst well, the processes struggle to accommodate very high heat of polymerization because of inefficient heat removal from the reactor. That is, reflux cooling, cooling jacket, or chilled feed for polymerization in a CSTR provide limited capability of heat removal, which results in higher reaction temperatures. Currently, metallocene catalysts are widely used in producing polyolefins because of their higher catalyst activity as compared to conventional Ziegler-Natta catalysts. However, metallocene catalysts generally require lower reaction temperatures than the Ziegler catalysts. Therefore, a dilute polymer concentration or reduced conversion is usually needed if a CSTR is used in solution or slurry polymerization processes.

The loop reactor can overcome the limitations of the CSTR in solution and slurry polymerization processes. Generally, loop reactors are several heat exchangers in a loop. The loop reactor can take away massive heat released by the polymerization reactions, which enables high polymer concentration and high monomer conversion. Moreover, with feed chilling, the temperature of reaction can be maintained at considerably lower temperatures than that in CSTR process, meeting the requirement of metallocene catalysts.

Molecular weight distribution has profound influence over the mechanical performance of polymers. In general, high molecular weight increases the strength, toughness, impact resistance, and crack resistance due to a high degree of polymer chain entanglement. However, high molecular weight also increases the viscosity, which makes processing the polymer more difficult. Low molecular weight enables higher molecular mobility and lower viscosity because more end groups increase free volume, resulting in polymer that is more easily processed. When a polymerization product is designed, it is important to balance both high and low molecular weight portions in polymer, in order to provide a polymer that can be simultaneously reasonable processed and produce an article with good mechanical properties. However, such balanced polymer design is not easy to achieve in solution or slurry polymerization processes because of the limitations of catalysts available, especially the widely applied metallocene catalyst system, which usually produces polymers having a narrow molecular weight distribution.

SUMMARY OF THE INVENTION

The present invention relates to controlling the molecular weight distribution and chemical composition of a polyolefin product from a polymerization reaction by controlling the polymerization parameters of recycle ratio, polymer concentration, and/or Loop Reactor Scale-Up Number ("LRSU Number") number in a loop reactor.

A first example embodiment is a method comprising: polymerizing a feedstock in the presence of a metallocene catalyst in a loop reactor to produce a polyolefin product, the feedstock comprising two or more monomers; and broadening a molecular weight distribution and/or broadening a chemical composition distribution of the polyolefin product by adjusting a polymerization parameter selected from the group consisting of decreasing a recycle ratio, increasing a polymer concentration, increasing a LRSU number, and any combination thereof.

Another example embodiment is a method comprising: polymerizing a feedstock in the presence of a metallocene catalyst in a loop reactor to produce a polyolefin product, the feedstock comprising two or more monomers; and narrowing a molecular weight distribution and/or narrowing a chemical composition distribution of the polyolefin product by adjusting a polymerization parameter selected from the group consisting of increasing a recycle ratio, decreasing a polymer concentration, decreasing a LRSU number, and any combination thereof.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
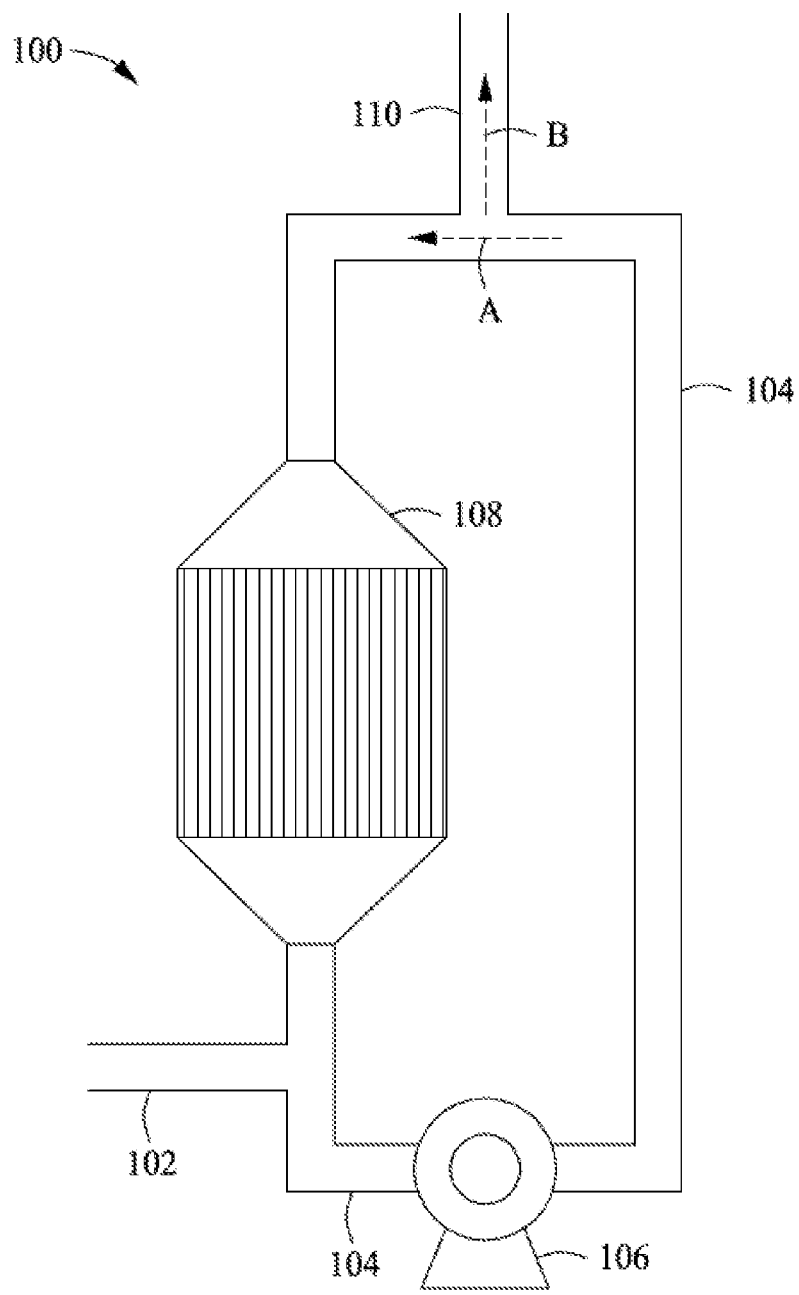
FIG. 1 illustrates a diagram of a loop reactor.

The present invention relates to controlling the molecular weight distribution and chemical composition distribution of a polyolefin product from a polymerization reaction by controlling the polymerization parameters of recycle ratio, polymer concentration, and/or LRSU number in a loop reactor. Although, in many cases a narrow distribution for both the molecular weight and chemical composition is desired, sometimes an intentionally broadened distribution polymer can simultaneously provide reasonable processability and produce an article with good mechanical properties. Therefore, the ability to control the molecular weight distribution and chemical composition distribution of a polyolefin product produced in a loop reactor can be very beneficial.

Definitions

A polydispersity index (PDI) is used herein to characterize the molecular weight distribution. PDI refers to the weight average molecular weight (Mw) divided by the number average molecular weight (Mn). Unless otherwise noted, all molecular weight units (e.g., Mw, Mn) are g/mol, and PDI is unitless. Molecular weights and PDI are determined by Gel Permeation Chromatography (GPC) as described in U.S. Patent Application Publication No. 2006/0173123, which is incorporated herein by reference.

A percent change of monomer content (%ΔCx) is used herein to characterize the chemical composition distribution, where Cx defines the monomer. The %ΔCx is the standard deviation of the Cx weight fraction in the polyolefin product divided by the mean Cx weight fraction in the polyolefin product times 100. The Cx weight fraction in the polyolefin product and the corresponding standard deviation and mean are determined by Temperature Rising Elation Fraction (TREF), as described in Wild, et al., J. Poly. Sci, Poly. Phys. Ed., vol. 20, p. 441 (1982), which is incorporated herein by reference. When the polyolefin is a copolymer of two monomers, the %ΔCx for each is the same, so either monomer can be referenced when describing the chemical composition distribution of the polyolefin product. When the polyolefin is a copolymer of three or more monomers, the greatest %ΔCx is used to characterize the chemical composition distribution of the polyolefin product.

As used herein, a "catalyst system" is the combination of at least one catalyst compound, at least one activator, and an optional co-activator.

As used herein, the "polymer concentration" of a loop reactor is a weight percent of polymer relative to the polymer-monomer total weight. Unless otherwise specified, the polymer concentration is measured at the effluent of the heat exchanger.

As used herein, the term "polymer concentration gradient" of a loop reactor is the polymer concentration at the effluent of the heat exchanger minus the polymer concentration at the inlet of the heat exchanger.

As used herein, the term "temperature gradient" is the temperature at the effluent of the heat exchanger minus the temperature at the inlet of the heat exchanger.

Loop Reactors

FIG. 1 illustrates a diagram of a loop reactor 100. Feedstock comprising two or more monomers is introduced to the loop line 104 of the loop reactor 100 via feedstock line 102. A pump 106 and a reactor 108 are in series along the loop line 104. Further, along the loop line 104 is a product line 110 where polyolefin product is removed from the loop reactor 100. The polyolefin product from the loop reactor 100 can be further treated, for example, with a devolatilization step. As illustrated, only one reactor 108 is shown. However, a loop reactor can include more than one reactor 108 in series.

One or more catalyst systems can be used in conjunction with the loop reactor 100. Catalyst systems can be injected to the loop reactor 100 with the feedstock or at additional ports (not illustrated) along the loop.

In this example, the reactor 108 comprises a heat exchanger used to control the temperature of the polymerization reaction. As described above, heat released by the polymerization reaction is absorbed by the solvent and removed by the heat exchanger.

Described herein are three polymerization parameters that can be adjusted, individually or in any combination, to change the molecular weight distribution and/or the chemical composition distribution of the polyolefin product.

In a loop reactor, the recycle ratio is defined as the ratio between the mass flow rate of the reactor effluent A recycled back to the reactor via the loop line 104 and the mass flow rate of the reactor effluent B extracted as polyolefin product from the reactor 100 via the product line 110. With a constant feed rate, a high recycle ratio represents a high portion of reactant coming back and mixed with fresh feed and a short residence time in the reactor per pass. Without being limited by theory, it is believed that the short residence time reduces the reactant and temperature gradients in the reactor and produces a product with a narrow molecular weight distribution and a narrow chemical composition distribution.

The recycle ratio can vary from 0.1 to 10, or 0.3 to 7, or 0.5 to 6. With all other variables constant, a lower recycle ratio (e.g., 0.1 to 1) can produce polyolefin product with a broader molecular weight distribution and a broader chemical composition distribution. Conversely, with all other variables constant, a higher recycle ratio (e.g., 2 or greater) can be used to produce a polyolefin product with a more narrow molecular weight distribution and a more narrow chemical composition distribution.

The polymer concentration is controlled by the catalyst reaction rate and the heat removed from the reactor (e.g., from the heat exchanger and feed chilling) Without being limited by theory, with a constant feed rate, a low polymer concentration can be attributed to a lower polymerization rate that results in lower temperature gradients and lower monomer concentration gradients across the reactor.

The polymer concentration can vary from 5 wt % to 50 wt %, or 10 wt % to 25 wt %. With all other variables constant, a lower polymer concentration (e.g., less than 15 wt %) can produce polyolefin product with a more narrow molecular weight distribution and a more narrow chemical composition distribution. Conversely, with all other variables constant, a higher polymer concentration (e.g., 15 wt % or greater) can be used to produce a polyolefin product with a broader molecular weight distribution and a broader chemical composition distribution.

A Damköhler number (Da) is a dimensionless number used in chemical engineering that relates reaction rate to transport rate. In its most commonly used form, the Damköhler number relates the reaction timescale to the convection time scale, volumetric flow rate, through the reactor for continuous (plug flow or stirred tank) or semi-batch chemical processes according to Eq. 1.

$$Da = \frac{\text{reaction rate}}{\text{convective mass transfer rate}} \qquad \text{Eq. 1}$$

The inventors have created a dimensionless parameter based on the Damköhler number that describes a polymerization process within a loop reactor, the Loop Reactor Scale-Up ("LRSU") number. Because the LRSU number is dimensionless, for a given reaction, it is constant between small scale loop reactors, such as that used in a pilot polymerization plant, and large scale reactors, such as that used in a commercial polymerization plant. In a loop polymerization process, the order of the reaction can be considered to be second-order. The LRSU number can be calculated by Eq. 2, where LRSU represents the LRSU number, $\tau$ is the residence time, $k_p$ is the polymerization rate constant of major monomer which is also a function of temperature, $C_{mon}$ is the major monomer concentration (i.e., and $C^*_{cat}$ is the reciprocal of catalyst activity. As used herein, the term "major monomer" refers to the monomer having the highest weight concentration in the feedstock.

$$LRSU = \tau k_p C_{mon} C^*_{cat} \qquad \text{Eq. 2}$$

Without being limited by theory, a small LRSU number can reduce the temperature gradient and monomer concentration gradient in the loop reactor, which leads to narrow chemical composition and molecular weight distribution.

The LRSU number can vary from 0.1 to 100, or 0.5 to 85. With all other variables constant, a lower LRSU number (e.g., less than 10) can produce polyolefin product with a narrower molecular weight distribution and a narrower chemical composition distribution. Conversely, with all other variables constant, a higher LRSU number (e.g., 15 or greater) can be used to produce a polyolefin product with a broader molecular weight distribution and a broader chemical composition distribution.

One or more of the three polymerization parameters (recycle ratio, polymer concentration, and/or LRSU number) can be used to control the molecular weight distribution and/or the chemical composition distribution. For example, a lower recycle rate and higher polymer concentration together can broaden the molecular weight distribution and broaden chemical composition distribution. Then, with a similar recycle ratio but decreased polymer concentration, the molecular weight distribution and chemical composition distribution may both still be reasonably broad but less broad than the foregoing case. Therefore, the three polymerization parameters can be used in tandem to dial in a desired molecular weight distribution and chemical composition distribution to achieve a balance in polymer melt processability and product mechanical properties.

The polyolefin product can have a molecular weight distribution with a PDI of 1.5 to 8, or 2 to 6. For a broader molecular weight distribution, the PDI may preferably be 3 or greater, or 3 to 8, or 3 to 6. Again, one or more of the three polymerization parameters described herein can be adjusted to achieve the broad molecular weight distribution.

The polyolefin product can have a chemical composition distribution with a %ΔC2 of 0.5% to 50%, or 1% to 45%. For a broader chemical composition distribution, the %ΔC2 may preferably be 15% or greater, or 15% to 50%, or 20% to 45%. Again, one or more of the three polymerization parameters described herein can be adjusted to achieve the broad chemical composition distribution.

Polymerization Process

The methods of the present disclosure can include forming a polyolefin product by polymerizing two or more monomers in the presence of a catalyst system in a loop reactor.

The polymerization processes described herein may be carried out in any manner known in the art. Any solution, suspension, slurry, or gas phase polymerization process known in the art can be used. Such processes can be run in a batch, semi-batch, or continuous mode. Preferably, the polymerization process is continuous.

For example, the polymerization process may be a slurry process. As used herein, the term "slurry polymerization process" means a polymerization process where a supported catalyst is employed and monomers are polymerized on the supported catalyst particles and at least 95 wt % of polymer products derived from the supported catalyst are in granular form as solid particles (not dissolved in the diluent). A slurry polymerization process generally operates between about 1 atmosphere (atm) to about 50 atm pressure (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. Examples of diluents include, but are not limited to, one methane, ethane, propane, butane, isobutane, isopentane, hexanes, heptanes, and any combination thereof. When a propane medium is used the process must be operated above the reaction diluent critical temperature and pressure. Preferably, a hexane or an isobutane medium is employed.

Suitable diluents/solvents for polymerization include non-coordinating, inert liquids. Examples include straight and branched-chain hydrocarbons, such as isobutane, butane, pentane, isopentane, hexane, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (ISOPAR™); perhalogenated hydrocarbons, such as perfluorinated C4-10 alkanes, chlorobenzene, and aromatic and alkylsubstituted aromatic compounds, such as benzene, toluene, mesitylene, and xylene. Suitable solvents also include liquid olefins that may that can be polymerized including ethylene, propylene, 1-butene, 1-hexene, 1-pentene, 3-methyl-1-pentene, 4-methyl-1-pentene, 1-octene, 1-decene, and mixtures thereof. In a preferred example, aliphatic hydrocarbon solvents are used as the solvent, such as isobutane, butane, pentane, isopentane, hexane, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another example, the solvent is not aromatic, preferably aromatics are present in the solvent at less than 1 wt %, preferably less than 0.5 wt %, preferably 0 wt % based upon the weight of the solvents.

In a preferred example, the feedstock concentration of monomers for the polymerization is 60 vol % solvent or less, preferably 40 vol % or less, or preferably 20 vol % or less, based on the total volume of the feedstream.

In another example, the polymerization process may be a solution polymerization. The process may comprise polymerizing two or more monomers dissolved in a solvent as described herein in the presence of a catalyst system under conditions to obtain a first effluent comprising a solution of polyolefin and solvent and/or unreacted monomer.

The polymerization processes may be conducted under conditions including a temperature of about 50° C. to about 220° C., preferably about 70° C. to about 210° C., preferably about 90° C. to about 200° C., preferably from 100° C. to 190° C., preferably from 130° C. to 160° C. The polymerization process may be conducted at a pressure of from about 120 psi to about 1800 psi (about 12,411 kPa), preferably from 200 psi to 1000 psi (about 1379 kPa to 6895 kPa), preferably from 300 psi to 600 psi (about 2068 kPa to 4137 kPa). Preferably, the pressure is about 450 psi (about 3103 kPa).

Hydrogen may be present during the polymerization process at a partial pressure of 0.001 psig to 50 psig (0.007 kPa to 345 kPa), preferably from 0.01 psig to 25 psig (0.07 kPa to 172 kPa), more preferably 0.1 psig to 10 psig (0.7 kPa to 70 kPa).

Catalyst System

Catalyst systems suitable for use in conjunction with the methods and systems of the present invention can preferably comprise metallocene catalysts and other single site catalysts because these catalysts generally produce polymers with narrow molecular weight distribution. The PDI values for polymers made with metallocene catalyst systems in homogeneous polymerization media are typically close to the statistically expected value of 2.0. However, any polymerization catalyst capable of polymerizing the monomers disclosed can be used if the catalyst is sufficiently active under the polymerization conditions disclosed herein. Thus, Group-3-10 transition metals can form suitable polymerization catalysts. A suitable olefin polymerization catalyst will be able to coordinate to, or otherwise associate with, an alkenyl unsaturation. Examples of olefin polymerization catalysts can include, but are not limited to, Ziegler-Natta catalyst compounds, metallocene catalyst compounds, late transition metal catalyst compounds, and other non-metallocene catalyst compounds.

As disclosed herein, Ziegler-Natta catalysts are those referred to as first, second, third, fourth, and fifth generation catalysts in the Propylene Handbook, E. P. Moore, Jr., Ed., Hanser, N.Y., 1996. Metallocene catalysts in the same reference are described as sixth generation catalysts. One exemplary non-metallocene catalyst compound comprises non-metallocene metal-centered, heteroaryl ligand catalyst compounds (where the metal is chosen from the Group 4, 5, 6, the lanthanide series, or the actinide series of the Periodic Table of the Elements).

Just as in the case of metallocene catalysts, these non-metallocene metal-centered, heteroaryl ligand catalyst compounds are typically made fresh by mixing a catalyst precursor compound with one or more activators. Non-metallocene metal-centered, heteroaryl ligand catalyst compounds are described in detail in PCT Patent Publications Nos. WO 02/38628, WO 03/040095 (pages 21 to 51), WO 03/040201 (pages 31 to 65), WO 03/040233 (pages 23 to 52), WO 03/040442 (pages 21 to 54), WO 2006/38628, and U.S. Patent Application Publication No. 2008/0153997, each of which is herein incorporated by reference.

Activators and associated activation methods can be used in a catalyst system. Examples of activators include, but are not limited to, aluminoxane and aluminum alkyl activators, ionizing activators, and nonionizing activators.

Examples of aluminoxane and aluminum alkyl activators and associated methods can be found in U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, and 5,103,031; European Patent and Application Publication Nos. EP 0 561 476 A1, EP 0 279 586 B1, EP 0 516 476 A, and EP 0 594 218 A1; and PCT Patent Publications No. WO 94/10180, which are each incorporated herein by reference.

Examples of ionizing activators and associated methods can be found in European Patent and Application Publication Nos. EP 0 570 982 A, EP 0 520 732 A, EP 0 495 375 A, EP 0 500 944 B1, EP 0 277 003 A and EP 0 277 004 A; and U.S. Pat. Nos. 5,153,157, 5,198,401, 5,066,741, 5,206,197, 5,241,025, 5,384,299, and 5,502,124.

Examples of nonionizing activators and associated methods can be found in E. Y.-X. Chen and T. J. Marks, "Cocatalysts for Metal-Catalyzed Olefin Polymerization: Activators, Activation Processes, and Structure-Activity Relationships", Chem. Rev., 100, 1391-1434 (2000).

Monomers

Any monomer having one or more (non-conjugated) aliphatic double bond(s) and two or more carbon atoms may be used. Examples of monomers include, but are not limited to, α-olefins (e.g., ethylene, propylene, butene-1, hexene-1, octene-1, decene-1, and dodecene-1), substituted olefins (e.g., styrene, paramethylstyrene, and vinylcyclohexane), non-conjugated dienes (e.g., vinylcyclohexene), α,ω-dienes (e.g., 1,5-hexadiene and 1,7-octadiene), cycloolefins (e.g., cyclopentene, cyclohexene, and cyclohexadiene), norbornene, and the like, and any combination thereof.

Olefin monomer or monomers can be used. Advantageous monomers include $C_2$ to $C_{100}$ olefins, advantageously $C_2$ to $C_{60}$ olefins, advantageously $C_3$ to $C_{40}$ olefins advantageously C3 to C20 olefins, advantageously $C_3$ to $C_{12}$ olefins. Monomers can include linear, branched or cyclic alpha-olefins, advantageously $C_3$ to $C_{100}$ alpha-olefins, advantageously $C_3$ to $C_{60}$ alpha-olefins, advantageously $C_3$ to $C_{40}$ alpha-olefins advantageously $C_3$ to $C_{20}$ alpha-olefins, advantageously $C_3$ to $C_{12}$ alpha-olefins. Advantageous olefin monomers can be one or more of ethylene, propylene, butene, pentene, hexene, heptene, octene, nonene, decene, dodecene, 4-methylpentene-1,3-methylpentene-1,3,5,5-trimethylhexene-1, and 5-ethylnonene-1.

Aromatic-group-containing monomers containing up to 30 carbon atoms can be used. Suitable aromatic-group-containing monomers comprise at least one aromatic structure, advantageously from one to three, more advantageously a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer can further be substituted with one or more hydrocarbyl groups including but not limited to $C_1$ to $C_{10}$ alkyl groups. Additionally two adjacent substitutions can be joined to form a ring structure. Advantageous aromatic-group-containing monomers contain at least one aromatic structure appended to a polymerizable olefinic moiety. Particularly advantageous aromatic monomers include styrene, alpha-methylstyrene, para-alkylstyrenes, vinyltoluenes, vinylnaphthalene, allyl benzene, and indene, especially styrene, paramethylstyrene, 4-phenyl-butene-1 and allylbenzene.

Non-aromatic cyclic group containing monomers can be used. These monomers can contain up to 30 carbon atoms. Suitable non-aromatic cyclic group containing monomers advantageously have at least one polymerizable olefinic group that is either pendant on the cyclic structure or is part of the cyclic structure. The cyclic structure can also be further substituted by one or more hydrocarbyl groups such as, but not limited to, $C_1$ to $C_{10}$ alkyl groups. Advantageous non-aromatic cyclic group containing monomers include vinylcyclohexane, vinylcyclohexene, vinylnorbornene, ethylidene norbornene, cyclopentadiene, cyclopentene, cyclohexene, cyclobutene, vinyladamantad and the like.

Diolefin monomer(s) can be used. Advantageous diolefin monomers include any hydrocarbon structure, advantageously $C_4$ to $C_{30}$, having at least two unsaturated bonds, wherein at least two of the unsaturated bonds are readily incorporated into a polymer by either a stereospecific or a non-stereospecific catalyst(s). It is further advantageous that the diolefin monomers be selected from alpha-omega diene monomers (e.g., divinyl monomers). More advantageously, the diolefin monomers are linear divinyl monomers, most advantageously those containing from 4 to 30 carbon atoms. Examples of advantageous dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly advantageous dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Advantageous cyclic dienes include cyclopentadiene, vinylnorbornene, norbornadiene, ethylidene norbornene, divinylbenzene, dicyclopentadiene or higher ring containing diolefins with or without substituents at various ring positions.

Example Embodiments

A first example embodiment is a method comprising: polymerizing a feedstock in the presence of a metallocene catalyst in a loop reactor to produce a polyolefin product, the feedstock comprising two or more monomers; and broadening a molecular weight distribution and/or broadening a chemical composition distribution of the polyolefin product by adjusting a polymerization parameter selected from the group consisting of decreasing a recycle ratio, increasing a polymer concentration, increasing a LRSU number, and any combination thereof. Optionally this method can further include one or more of the following: Element 1: wherein the a first of the two or more monomers is selected from the group consisting of: ethylene, propylene, butene, pentene, hexene, heptene, octene, nonene, decene, dodecene, 4-methylpentene-1,3-methylpentene-1,3,5,5-trimethylhexene-1, and 5-ethylnonene-1; Element 2: Element 1 and wherein a second of the two or more monomers is different than the first and is selected from the group consisting of: ethylene, propylene, butene, pentene, hexene, heptene, octene, nonene, decene, dodecene, 4-methylpentene-1,3-methylpentene-1,3,5,5-trimethylhexene-1, 5-ethylnonene-1, styrene, alpha-methylstyrene, para-alkylstyrenes, vinyltoluenes, vinylnaphthalene, allyl benzene, and indene, especially styrene, paramethylstyrene, 4-phenyl-butene-1, allylbenzene, vinylcyclohexane, vinylcyclohexene, vinylnorbornene, ethylidene norbornene, cyclopentadiene, cyclopentene, cyclohexene, cyclobutene, butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, and triacontadiene; Element 3: wherein the molecular weight distribution as measured by polydispersity index of the polyolefin product is 3 or greater; Element 4: wherein the chemical composition distribution as measured by percent change of monomer content of the polyolefin product is 15% or greater; Element 5: wherein after adjusting the polymerization parameter the recycle ratio is 1 or less, the polymer concentration is 15 wt % or greater, and/or the LRSU number is 15 or greater; Element 6: wherein the polymerizing is a slurry polymerization process performed at 15 psi to 735 psi and 0° C. to about 120° C.; and Element 7: wherein the polymerizing is a solution polymerization process performed at 120 psi to 1800 psi and 50° C. to 220° C. Examples of combinations of the foregoing include, but are not limited to, Element 1 and optionally Element 2 in combination with one or more of Elements 3-5 and optionally in further combination with Element 6 or 7; Element 1 and optionally Element 2 in combination with Element 6 or 7; one or more of Elements 3-5 in combination with Element 6 or 7; and two or more of Elements 3-5 in combination.

Another example embodiment is a method comprising: polymerizing a feedstock in the presence of a metallocene catalyst in a loop reactor to produce a polyolefin product, the feedstock comprising two or more monomers; and narrowing a molecular weight distribution and/or narrowing a chemical composition distribution of the polyolefin product by adjusting a polymerization parameter selected from the group consisting of increasing a recycle ratio, decreasing a polymer concentration, decreasing a LRSU number, and any combination thereof. Optionally this method can further include one or more of the following: Element 1; Element 2; Element 6; Element 7; Element 8: wherein the molecular weight distribution as measured by polydispersity index of the polyolefin product is less than 3; Element 9: wherein the chemical composition distribution as measured by percent change of monomer content of the polyolefin product is less than 15%; and Element 10: wherein after adjusting the polymerization parameter the recycle ratio is greater than 1, the polymer concentration is less than 15 wt %, and/or the LRSU number is less than 15. Examples of combinations of the foregoing include, but are not limited to, Element 1 and optionally Element 2 in combination with one or more of Elements 8-10 and optionally in further combination with Element 6 or 7; Element 1 and optionally Element 2 in combination with Element 6 or 7; one or more of Elements 8-10 in combination with Element 6 or 7; and two or more of Elements 8-10 in combination.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Example 1

A polymerization reaction was simulated with varied polymerization parameters of recycle ratio and polymer concentration. The simulation software used was Aspen Plus version 8.8 with the Aspen Polymer Module. The thermodynamic method is based on Perturbed-Chain Statistical Association Fluid Theory (PC-SAFT). The required material properties were directly obtained from the property data banks implemented in Aspen Plus. Plug flow reactors were used to simulate the heat exchangers and loop lines in the loop reactor. The heat exchangers were set to be in isothermal mode while the loop lines were treated adiabatically.

The reaction simulated in the example was copolymerization of ethylene and propylene. Copolymerization kinetics were obtained from the literature and implemented in the simulator. Therefore, both heat and mass balance and polymer properties, including chemical composition and molecular weight distribution can be accurately modeled. A metallocene catalyst was used in the catalyst system. The weight fraction ratio of ethylene monomer:propylene monomer:solvent was set to be 3.8%:35.4%:60.8%. The feedstock temperature was 5° C.

Twenty cases were modeled in this example. Because the polymerization reaction also happens in the loop lines where it should be adiabatic, the temperature in loop lines was determined by the heat released during the copolymerization reaction. The recycle ratio was adjusted between 0.25 and 6 while the polymer concentration was adjusted between approximately 24% and 12%.

Figure 2:
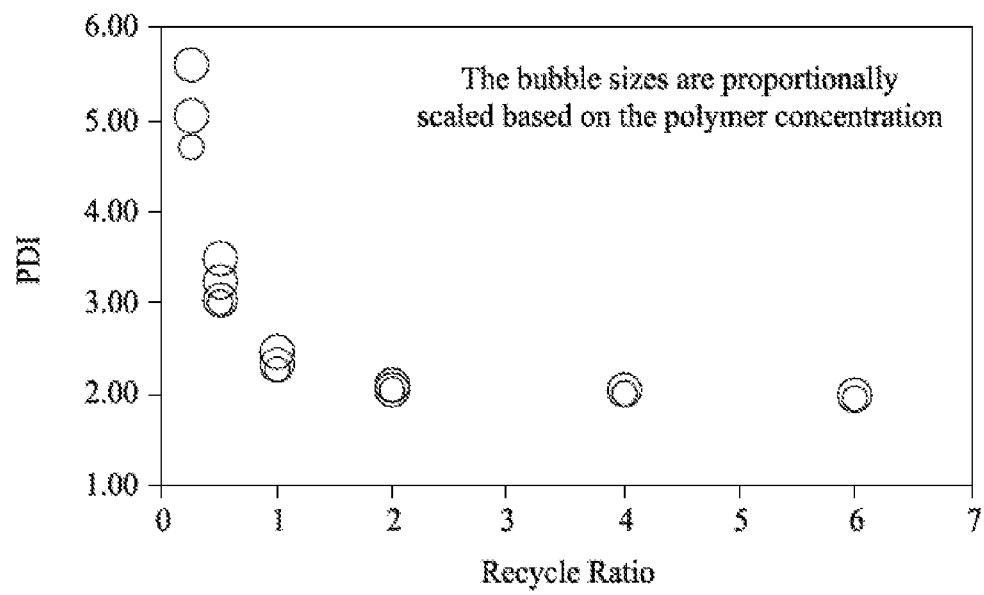
FIG. 2 is the polydispersity index (PDI) as a function of recycle ratio and polymer concentration for the polyolefin product of a first simulated polymerization process.
Figure 3:
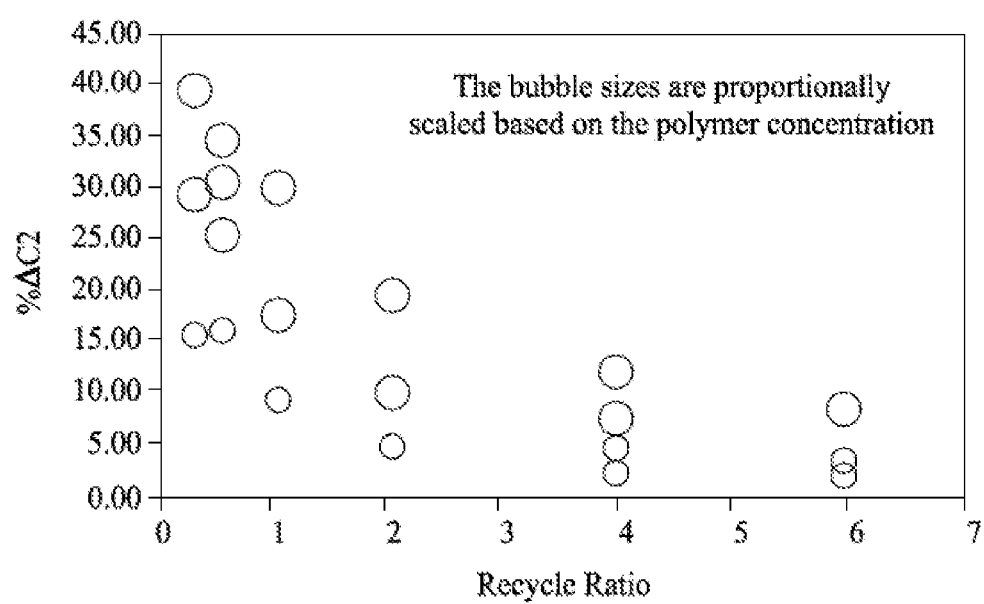
FIG. 3 is the percent change of ethylene content (%ΔC2) as a function of recycle ratio and polymer concentration for the polyolefin product of a first simulated polymerization process.

The molecular weight distribution was characterized by the polydispersity (PDI). The chemical composition distribution is characterized by the %ΔC2. FIG. 2 is the PDI as a function of recycle ratio and polymer concentration. FIG. 3 is the %ΔC2 as a function of recycle ratio and polymer concentration. In both FIGS. 2 and 3, the size of the bubble in the plot corresponds to relative polymer concentration. Table 1 is the data represented in the figures.

TABLE 1

| Case | Recycle Ratio | Polymer Conc. | PDI | % ΔC2 |
|---|---|---|---|---|
| 1 | 0.25 | 23.43% | 5.61 | 39.57 |
| 2 | 0.25 | 19.56% | 5.06 | 29.44 |
| 3 | 0.25 | 12.64% | 4.70 | 15.67 |
| 4 | 0.5 | 23.48% | 3.50 | 34.81 |
| 5 | 0.5 | 21.44% | 3.24 | 30.66 |
| 6 | 0.5 | 18.99% | 3.05 | 25.46 |
| 7 | 0.5 | 14.65% | 3.01 | 16.28 |
| 8 | 1 | 24.87% | 2.48 | 30.03 |
| 9 | 1 | 19.38% | 2.33 | 17.54 |
| 10 | 1 | 14.89% | 2.30 | 9.30 |
| 11 | 2 | 23.68% | 2.14 | 19.28 |
| 12 | 2 | 18.38% | 2.11 | 10.25 |
| 13 | 2 | 13.73% | 2.07 | 4.73 |
| 14 | 4 | 23.47% | 2.09 | 12.18 |
| 15 | 4 | 19.78% | 2.04 | 7.61 |
| 16 | 4 | 16.69% | 2.03 | 4.86 |
| 17 | 4 | 12.92% | 2.02 | 2.41 |
| 18 | 6 | 23.35% | 2.04 | 8.89 |
| 19 | 6 | 16.93% | 2.05 | 3.70 |
| 20 | 6 | 13.40% | 2.02 | 1.97 |

This example illustrates that reducing the recycle ratio and increasing the polymer concentration (individually or together) can be used to broaden the molecular weight distribution and/or broaden the chemical composition distribution. Conversely, increasing the recycle ratio and decreasing the polymer concentration (individually or together) can be used to narrow the molecular weight distribution and/or narrow the chemical composition distribution.

Example 2

Figure 4:
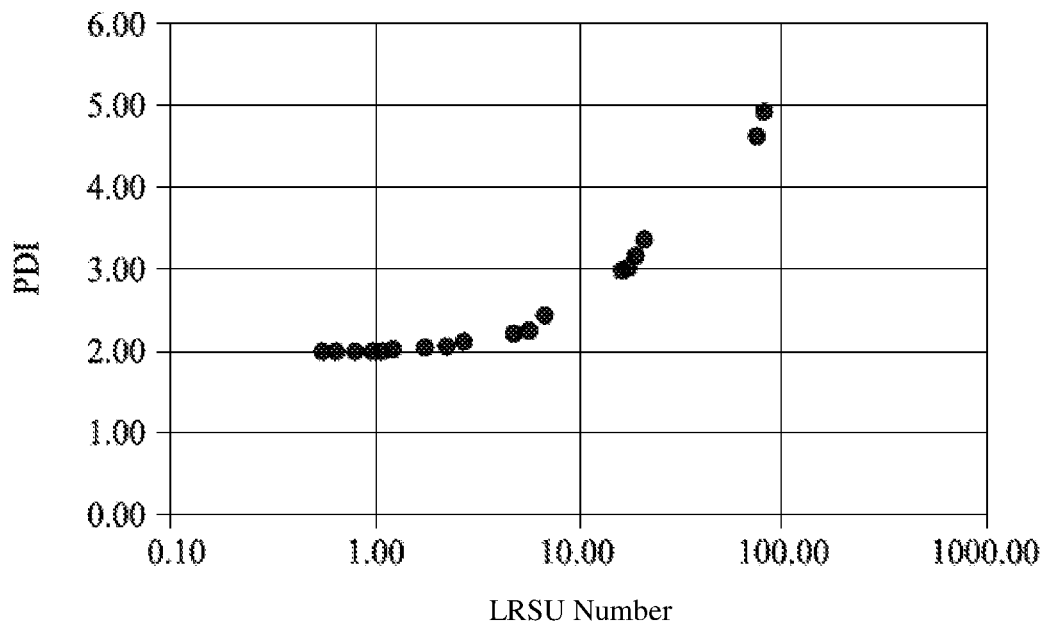
FIG. 4 is the PDI as a function of a LRSU number (LRSU) for the polyolefin product of a second simulated polymerization process.
Figure 5:
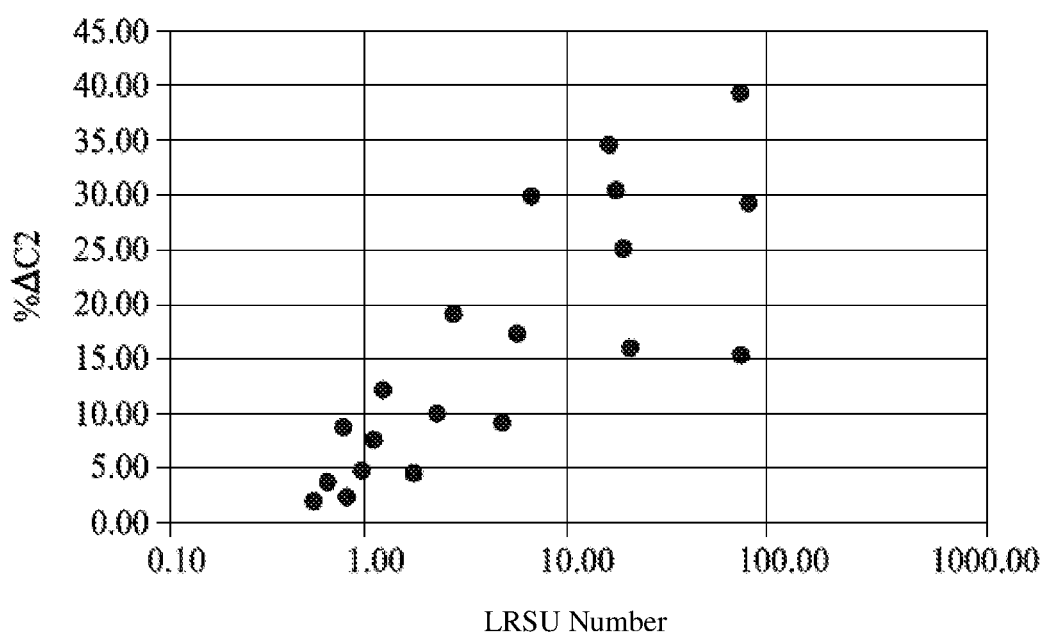
FIG. 5 is the %ΔC2 as a function of LRSU number for the polyolefin product of a second simulated polymerization process.

A polymerization reaction was simulated with varied polymerization parameter values for the Loop Reactor Scale-Up number (LRSU). As with Example 1, the simulation software used was Aspen Plus version 8.8 with the Aspen Polymer Module except the weight fraction ratio of ethylene monomer:propylene monomer:solvent was set to be 4.2%:33.7%:62.1%. Because propylene is the major monomer in the feedstock, the LRSU is based on propylene. The LRSU number was adjusted between 0.55 and 81.05. FIG. 4 is the PDI as a function of Da. FIG. 5 is the %ΔC2 as a function of Da. Table 2 is the data represented in the figures.

TABLE 2

| Case | LRSU | PDI | % ΔC2 |
|---|---|---|---|
| 1 | 0.55 | 2.01 | 1.95 |
| 2 | 0.65 | 2.01 | 3.67 |
| 3 | 0.78 | 2.02 | 8.85 |
| 4 | 0.81 | 2.01 | 2.39 |
| 5 | 0.97 | 2.02 | 4.84 |
| 6 | 1.10 | 2.02 | 7.59 |
| 7 | 1.22 | 2.04 | 12.15 |
| 8 | 1.74 | 2.05 | 4.59 |
| 9 | 2.24 | 2.07 | 10.06 |
| 10 | 2.74 | 2.13 | 19.27 |
| 11 | 4.75 | 2.23 | 9.22 |
| 12 | 5.76 | 2.28 | 17.50 |
| 13 | 6.71 | 2.44 | 29.94 |
| 14 | 16.24 | 3.00 | 34.74 |
| 15 | 17.37 | 3.04 | 30.51 |
| 16 | 19.08 | 3.18 | 25.34 |
| 17 | 20.76 | 3.38 | 16.18 |
| 18 | 73.35 | 4.02 | 39.42 |
| 19 | 74.63 | 4.65 | 15.61 |
| 20 | 81.05 | 4.95 | 29.42 |

This example illustrates that generally increasing the LRSU number broadens the molecular weight distribution and broadens the chemical composition distribution.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method for altering polymer properties comprising:
polymerizing a feedstock in the presence of a metallocene catalyst in a loop reactor to produce a polyolefin product, the feedstock comprising two or more monomers; and
broadening at least one of a molecular weight distribution and a chemical composition distribution of the polyolefin product by adjusting a polymerization parameter selected from the group consisting of decreasing a recycle ratio, increasing a LRSU number, and any combination thereof.

2. The method of claim 1, wherein a first of the two or more monomers is selected from the group consisting of: ethylene, propylene, butene, pentene, hexene, heptene, octene, nonene, decene, dodecene, 4-methylpentene-1,3-methylpentene-1,3,5,5-trimethylhexene-1, and 5-ethylnonene-1.

3. The method of claim 2, wherein a second of the two or more monomers is different than the first and is selected from the group consisting of: ethylene, propylene, butene, pentene, hexene, heptene, octene, nonene, decene, dodecene, 4-methylpentene-1,3-methylpentene-1,3,5,5-trimethylhexene-1, 5-ethylnonene-1, styrene, alpha-methylstyrene, para-alkylstyrenes, vinyltoluenes, vinylnaphthalene, indene, paramethylstyrene, 4-phenyl-butene-1, allylbenzene, vinylcyclohexane, vinylcyclohexene, vinylnorbornene, ethylidene norbornene, cyclopentadiene, cyclopentene, cyclohexene, cyclobutene, butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, and triacontadiene.

4. The method of claim 1, wherein the molecular weight distribution as measured by polydispersity index of the polyolefin product is 3 or greater.

5. The method of claim 1, wherein the chemical composition distribution as measured by percent change of monomer content of the polyolefin product is 15% or greater.

6. The method of claim 1, wherein after adjusting the polymerization parameter the recycle ratio is 1 or less, or the LRSU number is 15 or greater.

7. The method of claim 1, wherein the polymerizing is a slurry polymerization process performed at 15 psi to 735 psi and 0° C. to about 120° C.

8. The method of claim 1, wherein the polymerizing is a solution polymerization process performed at 120 psi to 1800 psi and 50° C. to 220° C.

9. A method for altering polymer properties comprising:
polymerizing a feedstock in the presence of a metallocene catalyst in a loop reactor to produce a polyolefin product, the feedstock comprising two or more monomers; and
narrowing at least one of a molecular weight distribution and a chemical composition distribution of the polyolefin product by adjusting a polymerization parameter selected from the group consisting of increasing a recycle ratio, decreasing a LRSU number, and any combination thereof.

10. The method of claim 9, wherein a first of the two or more monomers is selected from the group consisting of: ethylene, propylene, butene, pentene, hexene, heptene, octene, nonene, decene, dodecene, 4-methylpentene-1,3-methylpentene-1,3,5,5-trimethylhexene-1, and 5-ethylnonene-1.

11. The method of claim 10, wherein a second of the two or more monomers is different than the first and is selected from the group consisting of: ethylene, propylene, butene, pentene, hexene, heptene, octene, nonene, decene, dodecene, 4-methylpentene-1,3-methylpentene-1,3,5,5-trimethylhexene-1, 5-ethylnonene-1, styrene, alpha-methylstyrene, para-alkylstyrenes, vinyltoluenes, vinylnaphthalene, indene, paramethylstyrene, 4-phenyl-butene-1, allylbenzene, vinylcyclohexane, vinylcyclohexene, vinylnorbornene, ethylidene norbornene, cyclopentadiene, cyclopentene, cyclohexene, cyclobutene, butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, and triacontadiene.

12. The method of claim 9, wherein the molecular weight distribution as measured by polydispersity index of the polyolefin product is less than 3.

13. The method of claim 9, wherein the chemical composition distribution as measured by percent change of monomer content of the polyolefin product is less than 15%.

14. The method of claim 9, wherein after adjusting the polymerization parameter the recycle ratio is greater than 1, or the LRSU number is less than 15.

15. The method of claim 9, wherein the polymerizing is a slurry polymerization process performed at 15 psi to 735 psi and 0° C. to about 120° C.

16. The method of claim 9, wherein the polymerizing is a solution polymerization process performed at 120 psi to 1800 psi and 50° C. to 220° C.

17. A method for altering polymer properties comprising:
polymerizing a feedstock in the presence of a metallocene catalyst in a loop reactor to produce a polyolefin product, the feedstock comprising two or more monomers; and
altering a molecular weight distribution or a chemical composition distribution of the polyolefin product by adjusting a polymerization parameter selected from the group consisting of a recycle ratio, polymer concentration, LRSU number, and any combination thereof,
wherein the molecular weight distribution as measured by polydispersity index of the polyolefin product is 3 or greater.

18. The method of claim 17, wherein the polymerizing is a slurry polymerization process performed at 15 psi to 735 psi and 0° C. to about 120° C.

19. The method of claim 17, wherein the chemical composition distribution is altered, as measured by percent change of monomer content of the polyolefin product, by at least 15%.

20. The method of claim 17, wherein after adjusting the polymerization parameter, the recycle ratio is 1 or less, the polymer concentration is 15 wt % or greater, or the LRSU number is 15 or greater.

\* \* \* \* \*